US012110039B2

(12) United States Patent
Matsumura et al.

(10) Patent No.: US 12,110,039 B2
(45) Date of Patent: Oct. 8, 2024

(54) INFORMATION PROCESSING METHOD AND INFORMATION PROCESSING SYSTEM

(71) Applicant: Panasonic Intellectual Property Management Co., Ltd., Osaka (JP)

(72) Inventors: Yuki Matsumura, Kyoto (JP); Takahiro Yoneda, Osaka (JP); Yoshimasa Honda, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 218 days.

(21) Appl. No.: 17/846,346

(22) Filed: Jun. 22, 2022

(65) Prior Publication Data

US 2022/0324487 A1   Oct. 13, 2022

Related U.S. Application Data

(63) Continuation of application No. PCT/JP2021/009486, filed on Mar. 10, 2021.

(30) Foreign Application Priority Data

Mar. 26, 2020   (JP) .................................. 2020-055906

(51) Int. Cl.
*B60W 60/00*   (2020.01)
*B60W 30/09*   (2012.01)
(Continued)

(52) U.S. Cl.
CPC ...... *B60W 60/0015* (2020.02); *B60W 30/095* (2013.01); *B60W 50/14* (2013.01);
(Continued)

(58) Field of Classification Search
CPC ........... B60W 60/0015; B60W 30/095; B60W 50/14; B60W 2050/146; B60W 2420/403;
(Continued)

(56) References Cited

U.S. PATENT DOCUMENTS

2016/0071418 A1\* 3/2016 Oshida ................ B60W 30/165
701/23
2019/0361436 A1 11/2019 Ueda et al.
(Continued)

FOREIGN PATENT DOCUMENTS

JP      2008-165309    7/2008
JP      4861158        1/2012
(Continued)

OTHER PUBLICATIONS

International Search Report (ISR) issued on May 25, 2021 in International (PCT) Application No. PCT/JP2021/009486.
(Continued)

*Primary Examiner* — Rodney A Butler
(74) *Attorney, Agent, or Firm* — Wenderoth, Lind & Ponack, L.L.P.

(57) ABSTRACT

The information processing method includes processes of determining whether an emergency stop for a moving vehicle that is autonomously travelling has occurred; when it is determined that the emergency stop has occurred, simulating safety control based on a travel situation history of the moving vehicle; identifying a process that is a cause of the emergency stop from processes for the autonomous travel control indicated by a log of an autonomous driving system, based on the autonomous travel control indicated by the log and the safety control simulated; obtaining, from a database, one or more situation candidates corresponding to the process identified, and presenting an interface to an operator for inputting a situation candidate from the one or more situation candidates that corresponds to a situation indicated by the log; and determining restartability of the autonomous travel control by the autonomous driving system according to the situation candidate input.

12 Claims, 11 Drawing Sheets

(51) Int. Cl.
    *B60W 30/095*     (2012.01)
    *B60W 50/14*     (2020.01)

(52) U.S. Cl.
    CPC . *B60W 2050/146* (2013.01); *B60W 2420/403* (2013.01); *B60W 2540/215* (2020.02); *B60W 2556/10* (2020.02)

(58) Field of Classification Search
    CPC ....... B60W 2540/215; B60W 2556/10; B60W 50/0205; B60W 30/09; G08G 1/166; G08G 1/167; G05D 1/0038
    See application file for complete search history.

(56) References Cited

U.S. PATENT DOCUMENTS

| | | |
|---|---|---|
| 2021/0031807 A1 | 2/2021 | Yamamoto et al. |
| 2023/0311953 A1* | 10/2023 | Yamamoto ............... G08G 1/16 701/27 |

FOREIGN PATENT DOCUMENTS

| | | |
|---|---|---|
| JP | 2017-187839 | 10/2017 |
| WO | 2019/151266 | 8/2019 |

OTHER PUBLICATIONS

Extended European Search Report issued Aug. 8, 2023 in corresponding European Patent Application No. 21775655.0.

\* cited by examiner

INFORMATION PROCESSING METHOD AND INFORMATION PROCESSING SYSTEM

CROSS REFERENCE TO RELATED APPLICATIONS

This is a continuation application of PCT International Application No. PCT/JP2021/009486 filed on Mar. 10, 2021, designating the United States of America, which is based on and claims priority of Japanese Patent Application No. 2020-055906 filed on Mar. 26, 2020. The entire disclosures of the above-identified applications, including the specifications, drawings and claims are incorporated herein by reference in their entirety.

FIELD

This disclosure relates to an information processing method and the like, which is executed when an emergency stop of an autonomously travelling moving vehicle occurs.

BACKGROUND

With the development of autonomous driving technology in recent years, it is expected that a driverless transportation service will be realized by an autonomously travelling moving vehicle. In the actual operation of such a service, it is required that the operator can respond remotely in an emergency. In particular, the return of an emergency stopped moving vehicle has a high risk of an accident, so a mechanism is needed in which the operator who responds can remotely understand the situation and whether to stop the service or restart the service can be decided depending on whether there is a problem. For example, conventionally, there is a method of remotely grasping the external situation of a moving vehicle by checking an image of an in-vehicle camera (see Patent Literature (PTL) 1).

In addition, as an invention focusing on a process of the autonomous driving system, there is a display method for a moving vehicle that makes the occupants understand the cause of the occurrence of the sudden movement by the automatic control to relieve the occupants by visualizing the obstacles that have been detected by the autonomous driving system and the control of the moving vehicle that has been executed, (see PTL 2).

CITATION LIST

Patent Literature

PTL 1: Japanese Patent No. 4861158
PTL 2: Japanese Unexamined Patent Application Publication No. 2017-187839

SUMMARY

Technical Problem

However, the reason why the autonomous driving system has made an emergency stop is unknown only from the surroundings shown by the image as provided by the method described in PTL 1. It should be noted that PTL 1 does not disclose or suggest confirmation of the reason.

In addition, the display method for a moving vehicle described in PTL 2 is useful for a remote operator to understand the situation of the process of the autonomous driving system that has reached a sudden movement. However, it depends on the operator to determine if there is actually a problem with the travel restart of the moving vehicle. For that reason, it is difficult to reliably improve the safety of the travel restart.

The present disclosure provides an information processing method and an information processing system that can more reliably improve the safety of the travel restart when an autonomously travelling moving vehicle makes an emergency stop in order to avoid a collision with an obstacle.

Solution to Problem

The information processing method according to one aspect of the present disclosure is an information processing method executed by a processor, and includes processes of determining whether an emergency stop for causing a moving vehicle that is autonomously travelling to avoid a collision with an obstacle has occurred; when it is determined that the emergency stop has occurred, simulating safety control based on a travel situation history of the moving vehicle, the safety control being an autonomous travel control for causing the moving vehicle to autonomously travel to avoid the collision with the obstacle without performing the emergency stop; obtaining a log of an autonomous driving system that executes the autonomous travel control of the moving vehicle, and identifying a process that is a cause of the emergency stop from processes for the autonomous travel control indicated by the log, based on the autonomous travel control indicated by the log and the safety control simulated; obtaining, from a database related to situations that possibly lead to an occurrence of the emergency stop, one or more situation candidates corresponding to the process identified, and presenting an interface to an operator for inputting a situation candidate from the one or more situation candidates that corresponds to a situation indicated by the log; and determining restartability of the autonomous travel control by the autonomous driving system according to the situation candidate input.

In addition, the information processing system according to one aspect of the present disclosure is an information processing system including: one or more computers including a processor, wherein the processor determines whether an emergency stop for causing a moving vehicle that is autonomously travelling to avoid a collision with an obstacle has occurred; when it is determined that the emergency stop has occurred, simulates safety control based on a travel situation history of the moving vehicle, the safety control being an autonomous travel control for causing the moving vehicle to autonomously travel to avoid the collision with the obstacle without performing the emergency stop; obtains a log of an autonomous driving system that executes the autonomous travel control of the moving vehicle, and identifying a process that is a cause of the emergency stop from processes for the autonomous travel control indicated by the log, based on the autonomous travel control indicated by the log and the safety control simulated; obtains, from a database related to situations that possibly lead to an occurrence of the emergency stop, a situation candidate corresponding to the process identified, and presenting an interface to an operator for inputting the situation candidate corresponding to a situation indicated by the log; and determines restartability of the autonomous travel control by the autonomous driving system according to the situation candidate input.

It should be noted that these comprehensive or specific aspects may be realized by a device, an integrated circuit, a computer program, or a computer-readable recording medium such as a CD-ROM, or they may be realized by any combination of a device, a system, an integrated circuit, a method, a computer program and a recording medium.

Advantageous Effects

In the information processing method and information processing system according to the present disclosure, it is possible to more reliably improve the safety of the travel restart when an autonomously travelling moving vehicle makes an emergency stop in order to avoid a collision with an obstacle.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
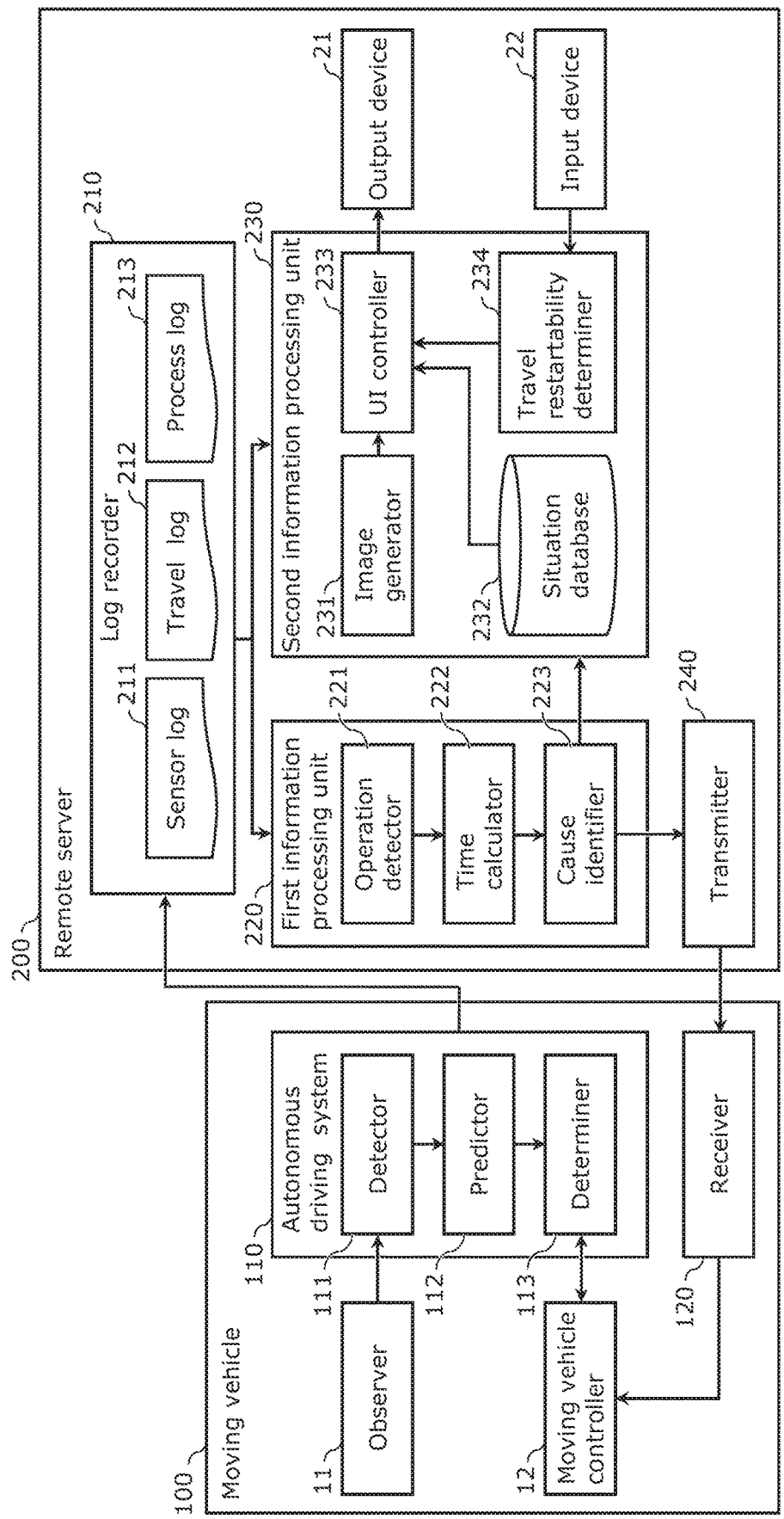
FIG. 1 is an overall configuration diagram of a mechanism including a moving vehicle including an autonomous driving system and a remote server according to an embodiment.

In order to solve the above problems, the information processing method according to one aspect of the present disclosure is an information processing method executed by a processor, the information processing method including: determining whether an emergency stop for causing a moving vehicle that is autonomously travelling to avoid a collision with an obstacle has occurred; when it is determined that the emergency stop has occurred, simulating safety control based on a travel situation history of the moving vehicle, the safety control being an autonomous travel control for causing the moving vehicle to autonomously travel to avoid the collision with the obstacle without performing the emergency stop; obtaining a log of an autonomous driving system that executes the autonomous travel control of the moving vehicle, and identifying a process that is a cause of the emergency stop from processes for the autonomous travel control indicated by the log, based on the autonomous travel control indicated by the log and the safety control simulated; obtaining, from a database related to situations that possibly lead to an occurrence of the emergency stop, one or more situation candidates corresponding to the process identified, and presenting an interface to an operator for inputting a situation candidate from the one or more situation candidates that corresponds to a situation indicated by the log; and determining restartability of the autonomous travel control by the autonomous driving system according to the situation candidate input.

This makes it possible to more reliably improve the safety of the travel restart when an autonomously travelling moving vehicle makes an emergency stop in order to avoid a collision with an obstacle.

In addition, for example, the identifying of the process that is the cause of the emergency stop may be performed based on a result of determining whether a result of a process required for executing the safety control was output before a safety control time, the safety control time being calculated by comparing the safety control with the autonomous travel control indicated by the log, the safety control time being a start time of execution of the safety control in the autonomous travel control of the moving vehicle. More specifically, for example, the process required for executing the safety control may be at least one of a detection process for obtaining a detection result indicating a surrounding situation of the moving vehicle, a prediction process for predicting the surrounding situation of the moving vehicle using the detection result, or a determination process for determining a travelling route according to the surrounding situation predicted.

Accordingly, it is possible to determine the restartability of the autonomous travel control according to the difference from the safety control that was possible in autonomous travelling or the ideal safety control, and to improve the safety of the travel restart more reliably.

In addition, for example, the interface may include an image generated using an output of the process identified and observation data input to the autonomous driving system. In addition, the interface may include an image generated further using an output obtained at the safety control time in the safety control. In addition, the interface may be for inputting the situation candidate corresponding to the situation indicated by the log for a time point after the safety control time.

This makes it possible for the operator to determine the suitability of the process of the autonomous driving system for a surrounding situation when the autonomously travelling moving vehicle makes an emergency stop, or for the observation data indicating the surrounding situation.

In addition, for example, the restartability of the autonomous travel control may be determined based on a value of a parameter indicating a safety level or a risk level of execution of the autonomous travel control, the value being set for the situation candidate input. In addition, the parameter may be based on a length of delay time from the safety control time of the output of the process identified. In addition, the parameter may be related to a time period corresponding to the situation candidate input, and the situation candidate may be input with respect to a time period until the safety control time.

This makes it easy to determine whether autonomous travelling can be restarted after an emergency stop without depending on the operator, and the safety of the travel restart can be improved more reliably.

In addition, for example, the safety control may be a control to stop the moving vehicle at a stop position in case of the emergency stop or at a position short of the stop position. In addition, for example, the safety control may be control to cause the moving vehicle to travel without colliding with the obstacle In order to solve the above problems, the information processing system according to one aspect of the present disclosure is an information processing system including: one or more computers including a processor, wherein the processor determines whether an emergency stop for causing a moving vehicle that is autonomously travelling to avoid a collision with an obstacle has occurred; when it is determined that the emergency stop has occurred, simulates safety control based on a travel situation history of the moving vehicle, the safety control being an autonomous travel control for causing the moving vehicle to autonomously travel to avoid the collision with the obstacle without performing the emergency stop; obtains a log of an autonomous driving system that executes the autonomous travel control of the moving vehicle, and identifying a process that is a cause of the emergency stop from processes for the autonomous travel control indicated by the log, based on the autonomous travel control indicated by the log and the safety control simulated; obtains, from a database related to situations that possibly lead to an occurrence of the emergency stop, a situation candidate corresponding to the process identified, and presenting an interface to an operator for inputting the situation candidate corresponding to a situation indicated by the log; and determines restartability of the autonomous travel control by the autonomous driving system according to the situation candidate input.

This makes it possible to restart travelling with more reliably improved safety when an autonomously travelling moving vehicle makes an emergency stop in order to avoid a collision with an obstacle.

It should be noted that these comprehensive or specific aspects may be realized by a device, an integrated circuit, a computer program, or a computer-readable recording medium such as a CD-ROM, or they may be realized by any combination of a device, a system, an integrated circuit, a method, a computer program and a recording medium.

Hereinafter, the embodiments of the information processing method and the information processing system according to the present disclosure will be described with reference to the drawings.

It should be noted that all of the embodiments described below show comprehensive or specific examples. The numerical values, shapes, materials, components, arrangement positions and connection forms of the components, steps, the order of steps, and the like shown in the embodiments are examples, and are not intended to limit the present invention.

[Configuration]

FIG. 1 is an overall configuration diagram of a mechanism including a moving vehicle including an autonomous driving system and a remote server according to the present embodiment.

The information processing method according to the present disclosure is executed by a processor in a mechanism including moving vehicle 100 that autonomously travels shown in FIG. 1 and remote server 200 that is wirelessly connected to moving vehicle 100.

(Moving Vehicle)

Moving vehicle 100 includes autonomous driving system 110, receiver 120, observer 11, and moving vehicle controller 12.

Observer 11 observes by sensing the surroundings of moving vehicle 100. Observer 11 is realized by using, for example, a camera, a radio detecting and ranging (Radar) or a light detection and ranging or laser imaging detection and ranging (LiDAR). The observation data showing the result of this observation is provided from observer 11 to autonomous driving system 110.

Moving vehicle controller 12 controls the travelling of moving vehicle 100 according to the instruction related to the operation control from autonomous driving system 110. For example, moving vehicle controller 12 is realized by using a circuit that controls the steering angle and acceleration/deceleration of the moving vehicle. In addition, information indicating the content of this control (hereinafter, also referred to as steering/acceleration/deceleration information) is provided from moving vehicle controller 12 to autonomous driving system 110.

Autonomous driving system 110 has detector 111, predictor 112, and determiner 113 as functional components.

Detector 111 obtains and outputs information on the detection of an obstacle, the type, size, relative position and the relative speed of the obstacle with moving vehicle 100 by a process for the observation data such as an image or a point cloud obtained by observer 11.

Predictor 112 predicts and outputs the movement route of the detected obstacle by a process for the information obtained from detector 111 and the behavior prediction technology.

Determiner 113 dynamically plans the route of moving vehicle 100 by a process of the predicted movement route for the obstacle obtained from predictor 112 and moving vehicle 100 to the steering information/the acceleration and deceleration information obtained from moving vehicle controller 12. Then, determiner 113 determines the content of the driving control including at least one of the next steering control or the acceleration and deceleration control for causing moving vehicle 100 to travel on a route which has been planned (hereinafter, also referred to as a planned route), and outputs an instruction including the content of the determined driving control to moving vehicle controller 12. It should be noted that the steering control amount and the acceleration and deceleration control amount instructed by determiner 113 have a predetermined upper limit as a normal travelling limit. When a situation requiring a control amount exceeding this upper limit, for example, a control exceeding a predetermined deceleration occurs, determiner 113 instructs braking for an emergency stop. When such an instruction for the emergency stop is issued, the driving control for travelling of moving vehicle 100 by moving vehicle controller 12 in response to the instruction from determiner 113 is not performed until the predetermined procedure involving remote server 200 is performed.

Receiver 120 receives a travel restartability signal by wireless communication with transmitter 240 included in remote server 200. When the travel restartability signal received by receiver 120 indicates that travel can be restarted, moving vehicle 100 returns to a state in which moving vehicle controller 12 executes driving control according to an instruction from determiner 113.

Moving vehicle controller 12, autonomous driving system 110, and receiver 120 can be realized using one or more electronic control units (ECUs) included in various driving control systems included in the vehicle-mounted network system constructed on the vehicle-mounted network included in moving vehicle 100. The ECU is, for example, a device including a processor (microprocessor), a digital circuit such as a memory, an analog circuit, a communication circuit, and the like. The memory includes a read-only memory (ROM) and a random access memory (RAM), and can store a control program (computer program) executed by the processor. The ECU provides the functions of each of the above-mentioned components by operating the processor according to the control program. A computer program is a combination of a plurality of instruction codes for a processor in order to realize a predetermined function.

(Remote Server)

Remote server 200 is an example of an information processing system including one or more computers including a processor. When an emergency stop occurs in autonomously travelling moving vehicle 100, remote server 200 provides information, which can be used for determining whether the emergency stop occurs due to an abnormality in autonomous driving system 110 or is unavoidable due to the situation, to the operator. In addition, remote server 200 determines restartability of the autonomous travelling in response to this input from the operator, and transmits a signal indicating the determination result of the travel restartability to moving vehicle 100.

Remote server 200 is, for example, a device including a processor, a memory, a communication circuit, and the like. The memory includes a ROM and a RAM, and can store a control program (computer program) executed by the processor. Remote server 200 includes log recorder 210, first information processing unit 220, second information processing unit 230, transmitter 240, output device 21, and input device 22. It should be noted that an information processing system may be configured by distributing and arranging each component included in remote server 200 on a plurality of servers.

Output device 21 outputs information to the outside of remote server 200. Examples of output device 21 include a liquid crystal display and a speaker. Input device 22 receives an input from the outside of remote server 200. Examples of input device 22 include a keyboard, a mouse, and a microphone. In addition, output device 21 and input device 22 may be provided by a touch screen.

Log recorder 210 obtains and records sensor log 211, travel log 212, and process log 213 by wireless communication with autonomous driving system 110. Sensor log 211 is a history of observation data indicating an image, a point cloud, or the like input to detector 111. Travel log 212 is a history of speed or position information of moving vehicle 100 input to determiner 113. Travel log 212 may include an operation history of an actuator (for example, a brake, an accelerator, or a steering actuator) related to the travel of moving vehicle 100. Process log 213 is a history of processing results of detector 111, predictor 112, and determiner 113. It should be noted that for determiner 113, the history of the planned route is also included in process log 213.

First information processing unit 220 has operation detector 221, time calculator 222, and cause identifier 223 as functional components. It should be noted that these components are realized by a processor or the like.

Operation detector 221 monitors the issuance of an emergency stop instruction for moving vehicle 100 by determiner 113 of autonomous driving system 110 with reference to process log 213, and detects the occurrence of an emergency stop. When the occurrence of the emergency stop is detected, this detection result is output as a trigger for the subsequent processes by time calculator 222 and the like. The instruction of the emergency stop may be indicated by, for example, a flag given to the instruction, or may be determined from the content of the instruction of the braking control (the magnitude of the braking force, braking force distribution, and the like). It should be noted that if moving vehicle 100 is equipped with an emergency stop means such as a collision damage mitigation brake that operates separately from the emergency stop for which an instruction is issued by determiner 113, operation detector 221 may detect the operation of the emergency stop means with reference to travel log 212, and output this detection result as the trigger described above.

Time calculator 222 calculates the safety control limit time from travel log 212. The safety control in the present embodiment means a control in which moving vehicle 100 stops at a position where moving vehicle 100 has stopped due to an emergency stop by a normal autonomous travel control (that is, with no emergency stop), and is a control of moving vehicle 100 by time calculator 222 on a simulation.

Time $T_0$ is calculated assuming that the speed of the moving vehicle at time t is $v_t$, the position of the moving vehicle is $I_t$, the time when the moving vehicle stopped due to an emergency stop is T, and the maximum deceleration in normal autonomous travel control is represented as Math. 1 indicated below.

$$\hat{a} \quad \text{[Math. 1]}$$

Time $T_0$ is the solution of the minimization problem represented by the following Equation 1, and is calculated as the safety control limit time.

[Math. 2]

(Equation 1)
$$T_0 = \operatorname*{argmin}_t (T-t) \text{ s.t. } \frac{v_t^2}{2\hat{a}} + v_t \Delta t < \sum_{k=t}^{T-1} \text{distance }(l_k, l_{k+1}) \cap t \leq T$$

It should be noted that Δt indicates the process delay time from when autonomous driving system 110 outputs the moving vehicle control for the emergency stop until moving vehicle 100 actually starts the emergency stop. In addition, distance $(l_k, l_{k+1})$ indicates the distance from the position $I_k$ to the position $l_{k+1}$, and for example, the Euclidean distance can be used.

The safety control limit time calculated as described above is an example of the safety control time, which is the start time of the safety control for executing the safety control in the autonomous travel control of moving vehicle 100. In other words, the safety control limit time can be said to be the latest time in which the safety control can be started as a feasible control in the autonomous travel control of moving vehicle 100. In the following, the safety control limit time will be used for explanation, but the safety control start time does not necessarily have to be the latest time (that is, the safety control limit time), and may be an earlier time than the latest time.

Cause identifier 223 identifies the cause of the emergency stop that has occurred from the processes for autonomous travel control executed in autonomous driving system 110 by using time $T_0$ calculated by time calculator 222 and process log 213. Specifically, cause identifier 223 identifies a process that is the cause of the emergency stop from the process by detector 111 (hereinafter, also referred to as detection process), the process by predictor 112 (hereinafter, also referred to as prediction process), and the process by determiner 113 (hereinafter, also referred to as determination process), based on the time from time $T_0$ to time T when moving vehicle 100 is stopped due to the emergency stop. This process will be described below.

As a premise, the emergency stop is executed to avoid a collision with an obstacle, and at least the obstacle related to the emergency stop is detected by autonomous driving system 110 at time T' when the emergency stop is started. In addition, for detecting the speed of an obstacle and predicting a movement route, an object tracking technology for associating the obstacle with a time series is used in general. Autonomous driving system 110 according to the present embodiment also equates an obstacle related to an emergency stop detected at a certain time with the obstacle detected at another time based on the information obtained by predictor 112 adopting this object tracking technology or the information obtained from the outside using the technology. Hereinafter, for the sake of explanation, the obstacle related to the emergency stop is referred to as a target.

What of the detection process, the prediction process, and the determination process is the cause of the emergency stop is determined from the result of the process for the target.

The position of the target at time t output by detector 111 is represented by detection(target,t). Here, if detector 111 has not obtained the target position, it is represented as follows:

$$\text{detection}(\text{target}, t) = \text{NULL}$$

When detection(target,t) returns NULL after safety control limit time $T_0$, cause identifier 223 identifies the process by detector 111 as the cause having led to the emergency stop.

If the process by detector 111 is not identified as the cause having led to the emergency stop of moving vehicle 100, the process by predictor 112 may be the cause having led to the emergency stop. The probability that the target at time t output by predictor 112 moves to the position of the target at time T' when the emergency stop is started is represented by prediction(target,t).

When prediction(target,t) falls below the threshold value after safety control limit time $T_0$, cause identifier 223 identifies the process by predictor 112 as the cause having led to the emergency stop of moving vehicle 100. As the position of the target at time T' when the emergency stop is started, for example, the output detection(target,T') of detector 111, which is the process in the previous stage, can be used.

If neither the process by detector 111 nor the process by predictor 112 has been identified as the cause having led to the emergency stop of moving vehicle 100, the process by determiner 113 may be the cause having led to the emergency stop. If the position of the target at time T' when the emergency stop was started can be predicted, ideally, moving vehicle 100 can decelerate at a deceleration and stop without making an emergency stop, and the deceleration is lower than or equal to the maximum deceleration in normal autonomous travel control represented as Math. 3 indicated below.

$$\bar{a} \quad [\text{Math. 3}]$$

Therefore, it is determined whether the process by determiner 113 is the cause of the emergency stop depending on whether determiner 113 has output an instruction for deceleration at a deceleration that satisfies the above.

The deceleration of moving vehicle 100 at time t output by determiner 113 is represented by $a_t$. Here, when moving vehicle 100 accelerates, $a_t$ is represented as follows:

$$a_t = \text{NULL}$$

When $a_t$ returns NULL after safety control limit time $T_0$, or a condition is satisfied, cause identifier 223 identifies the process by determiner 113 as the cause having led to the emergency stop, where the condition is expressed by Expression 2 below.

[Math. 4]

$$\frac{v_t^2}{2a_t} + v_t \Delta t > \sum_{k=t}^{T-1} \text{distance }(l_k, l_{k+1}). \quad \text{(Expression 2)}$$

Expression 2 indicates that the stopping distance of moving vehicle 100 at the deceleration $a_t$ is larger than the distance to the position where moving vehicle 100 has stopped due to the emergency stop.

Here, if the process by determiner 113 has not been identified as the cause having led to the emergency stop, it means that autonomous driving system 110 has output the number of vehicles so that determiner 113 the instruction of braking at a deceleration as moving vehicle 100 can stop short of the actual stop position without executing the emergency stop. Nevertheless, the fact that the emergency stop was executed means that the cause having led to the emergency stop is other than the process by autonomous driving system 110. In other words, it can be said that moving vehicle 100 is in a situation where it is impossible to continue travelling under the driving control by autonomous driving system 110. In the present embodiment, moving vehicle 100 in such a situation is treated as if a system error has occurred, and cause identifier 223 outputs information indicating "autonomous travel restart impossible" to transmitter 240.

As described above, first information processing unit 220 detects the occurrence of an emergency stop, and identifies the process that is the cause having led to the emergency stop from the processes for autonomous travel control executed by each functional component in autonomous driving system 110. The process identified as the cause is notified from first information processing unit 220 to second information processing unit 230.

Second information processing unit 230 includes image generator 231, situation database (also referred to as a situation DB in FIG. 11 to be described later) 232, UI controller 233, and travel restartability determiner 234 as functional components. It should be noted that these components are realized by a processor or the like.

Image generator 231 generates an image according to the process identified by first information processing unit 220 as the cause having led to the emergency stop. For example, image generator 231 uses the information extracted from log recorder 210 to generate an image showing the situation in which moving vehicle 100 has reached an emergency stop. Image generator 231 generates such an image corresponding to, for example, a time from the safety control limit time to the time when the moving vehicle has stopped due to an emergency stop. The generated image is presented to the operator involved in the determination of the restartability of the autonomous travelling of moving vehicle 100 via output device 21 described above. This image will be described later with reference to FIG. 2A to FIG. 7B.

In situation database 232, candidates for situations in which an emergency stop may occur according to the processes of autonomous driving system 110 are registered.

The following is an example of candidates for the above situation related to the process by detector 111.

"The obstacle related to the emergency stop was hidden in the blind spot from the moving vehicle."

"The obstacle related to the emergency stop was partially/temporarily hidden by another obstacle."

In addition, the following is an example of the candidates of the above situation related to process by predictor 112.

"The obstacle related to the emergency stop has started moving."

"The obstacle related to the emergency stop had been moving, but it stopped."

"The obstacle related to the emergency stop changed the direction of travel while moving."

In addition, the following is an example of the candidate of the above situation related to the process by determiner 113.

"Another obstacle has entered the planned travel route of the moving vehicle"

The above candidates for situations are listed in advance by the developer or the servicer based on the processing capacity of autonomous driving system 110, and are registered in situation database 232. When a large number of candidates are registered, it becomes difficult for the operator to make an appropriate selection. On the other hand, if there are few candidates or there is an omission in the listing in advance, there is also a possibility that there will be many selections of situations that do not correspond to any of the candidates.

For example, when the number of candidates is greater than or equal to the first threshold value, narrowing down of candidates or provisional selection of candidates as described later may be executed.

In addition, for example, when the number of candidates is smaller than the second threshold value, when the number of selections of "not applicable", which is a situation that does not correspond to any candidate, becomes the third threshold value or more, or when there is a candidate whose number of selections within a predetermined period is smaller than the fourth threshold value, an alert may be notified to the operator.

Because it is thought that the above problems will occur no matter how carefully the preliminary verification is performed, it is possible to prompt the update by the notification of the above alert. In addition, the video or the system log of the case in which "Not applicable" was selected may be stored so as not to be deleted for the update of the candidate. In addition, if possible, free descriptions by the operator and the like may be stored. By using the information stored in this way, it is possible to streamline the selection of new candidates. Furthermore, the autonomous driving system may be improved based on the stored information. This makes it possible for developers or service designers to understand the scenes where emergency stops are often made, the autonomous driving system is updated to avoid emergency stops, and the service route is changed to a route where emergency stops are less likely to occur, or the speed limit is reset to a speed at which emergency stops are less likely to occur. Accordingly, improvement of services by the autonomous driving system can be expected.

The situation in which the emergency stop described above with an example may occur is used as a component of the UI described later, which is realized by using output device 21 and input device 22.

UI controller 233 uses output device 21 to present to the operator the process in autonomous driving system 110 identified as the cause having led to the emergency stop. The details of the UI will be described later using an example.

Travel restartability determiner 234 determines whether the travel can be restarted based on the input result from the operator for the candidate of the situation where the emergency stop may occur. Travel restartability determiner 234 is realized by, for example, an artificial intelligence (AI) model that outputs a determination result of whether the travelling of the autonomously travelling vehicle can be restarted by autonomous travelling with the occurrence situation of an emergency stop as an input. The method of determining this travel restartability will be described later using an example.

Transmitter 240 transmits a travel restartability signal by wireless communication with receiver 120 included in moving vehicle 100.

(Screen Presented by UI)

Next, the screen generated by image generator 231 and presented to the operator as a UI will be described with reference to FIG. 2A to FIG. 7B. The images shown in FIG. 2A to FIG. 7B are schematic views of image examples generated according to the types of processes identified as the cause having led to the emergency stop in first information processing unit 220.

Figure 2A:
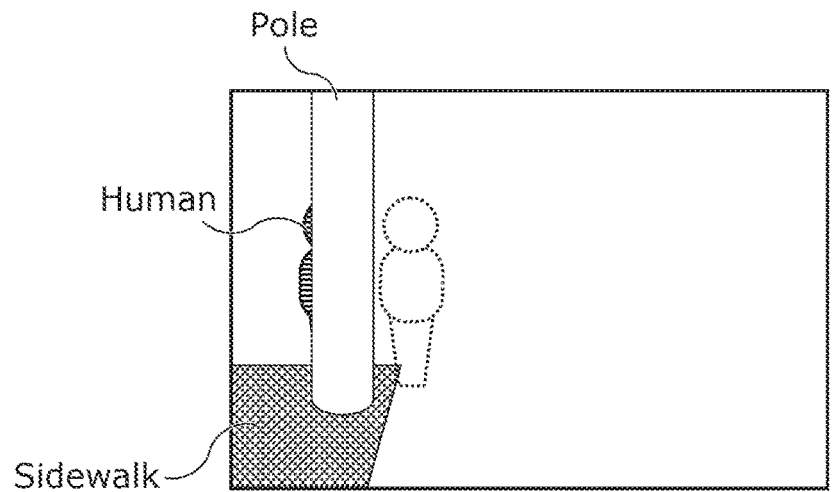
FIG. 2A is a schematic diagram for explaining an image generated by the remote server described above when a process by a detector is identified as a cause of an emergency stop.
Figure 2B:
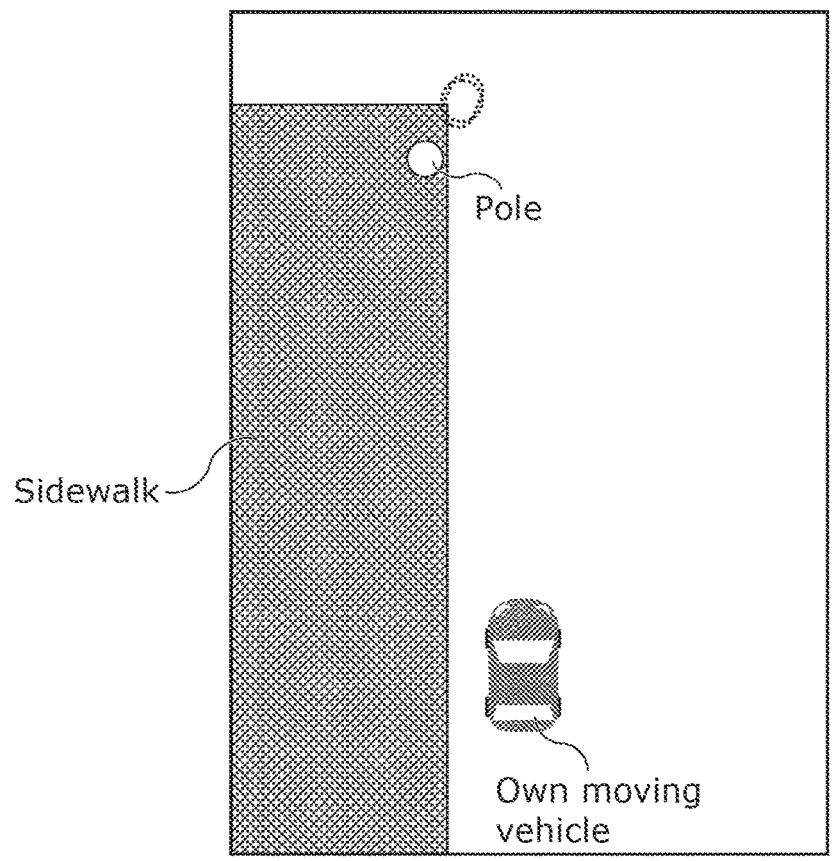
FIG. 2B is a schematic diagram for explaining an image generated by the remote server described above when the process by the detector is identified as a cause of an emergency stop of the moving vehicle described above.

1. In a Case where the Detection Process is Identified as the Cause Having LED to the Emergency Stop FIG. 2A and FIG. 2B are schematic diagrams for explaining an image generated by image generator 231 using the log of data generated by observer 11 and data generated by autonomous driving system 110 for a time period from safety control limit time $T_0$ to time $T_a$ when detector 111 starts detecting the target. More specifically, FIG. 2A is a schematic diagram of an image generated by image generator 231 based on the data output by the vehicle-mounted camera which is observer 11 of moving vehicle 100 (the same applies to FIG. 3A, FIG. 4A, FIG. 5A, FIG. 6A, and FIG. 7A described later). In addition, FIG. 2B is a schematic diagram of an image generated by image generator 231 based on the data (object extraction processed) output by LIDAR which is observer 11 of moving vehicle 100 (the same applies to FIG. 3B, FIG. 4B, FIG. 5B, FIG. 6B, and FIG. 7B described later).

Each image of FIG. 2A and FIG. 2B is based on the data obtained by observer 11 at safety control limit time $T_0$. It should be noted that FIG. 2B is drawn from a viewpoint above moving vehicle 100 (the same applies to FIG. 3B, FIG. 4B, FIG. 5B, FIG. 6B, and FIG. 7B described later). The human-shaped transmission image having the outline of the dotted line in FIG. 2A and FIG. 2B is the image of the target (human in this example) detected at time $T_a$ superimposed by image generator 231 based on sensor log 211 which is in log recorder 210.

With reference to FIG. 2A, in the area to the left of the image, the figure of a person on the sidewalk as seen from (observer 11 of) moving vehicle 100 is almost entirely hidden by a columnar object ("pillar" in the figure). However, referring to FIG. 2B, it can be seen that this person who is on the sidewalk does not appear in the data output by LiDAR. The operator described above refers to these images in chronological order including safety control limit time $T_0$ in order to understand the situation in which moving vehicle 100 has reached an emergency stop. For example, the operator sees these images to understand that such a situation occurred in which detector 111 could not obtain the position of the target by safety control limit time $T_0$ because the target had been hidden by the object seen from moving vehicle 100 before the emergency stop of moving vehicle 100.

It should be noted that the characters indicating the object shown in the images in FIG. 2A and FIG. 2B are added for convenience of explanation, and the characters of such explanation may be omitted in the figures referred to below.

Figure 3A:
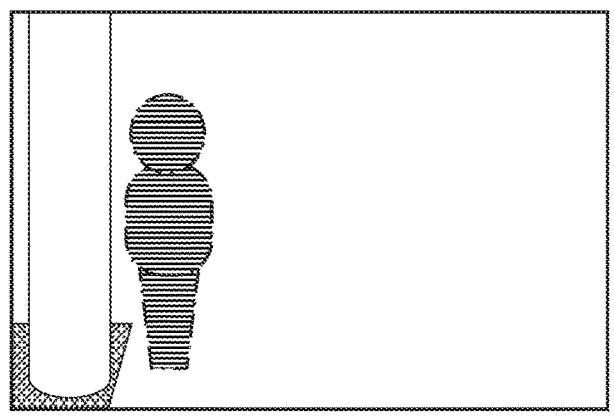
FIG. 3A is an image generated by the remote server described above when the process by the detector is identified as the cause of the emergency stop of the moving vehicle described above.
Figure 3B:
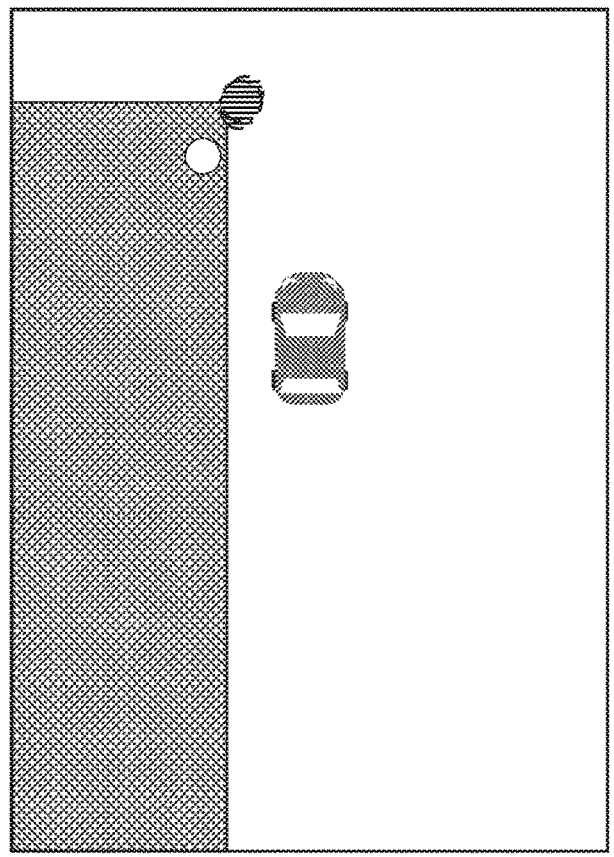
FIG. 3B is a schematic diagram for explaining an image generated by the remote server described above when the process by the detector is identified as the cause of the emergency stop of the moving vehicle described above.

FIG. 3A and FIG. 3B are schematic diagrams for explaining the images generated by image generator 231 using the log of the data generated by observer 11 and the data generated by autonomous driving system 110 from time $T_a$ when detector 111 started detecting the target to time T when moving vehicle 100 stopped due to an emergency stop.

The human-shaped image in FIG. 3A and FIG. 3B is an image of a person who was the target of the detection process at time $T_a$, and the outline thereof is represented only by a dotted line in FIG. 2A and FIG. 2B. In FIG. 3A and FIG. 3B, the outline of the alternate long and short dash line is superimposed on this image of the target by image generator 231 as being consistent with the image based on which determiner 113 has determined the execution of the emergency stop.

For example, detector 111 determines that the operator who sees the images of FIG. 3A and FIG. 3B as a continuation of the images of FIG. 2A and FIG. 2B can understand that the determination in autonomous driving system 110 to execute the emergency stop of moving vehicle 100 was made to the target whose detection had been started at a time after the safety control limit time $T_0$ by detector 111.

2. In a Case where a Prediction Process is Identified as the Cause Having LED to the Emergency Stop FIG. 4A and FIG. 4B are schematic diagrams for explaining the images generated by image generator 231 using the data obtained by observer 11 in the time from time $T_a$ when detector 111 starts detecting the target to time $T_b$ when predictor 112 outputs the prediction result of the target position related to the emergency stop with a probability of a predetermined threshold value or more through safety control limit time $T_0$.

Figure 4A:
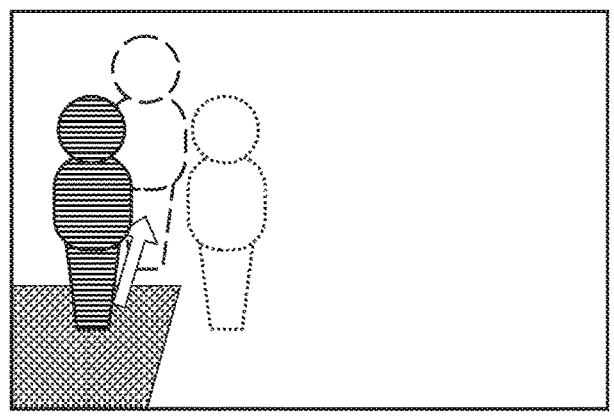
FIG. 4A is an example of an image generated by the remote server described above when a process by the predictor is identified as the cause of the emergency stop of the moving vehicle described above.
Figure 4B:
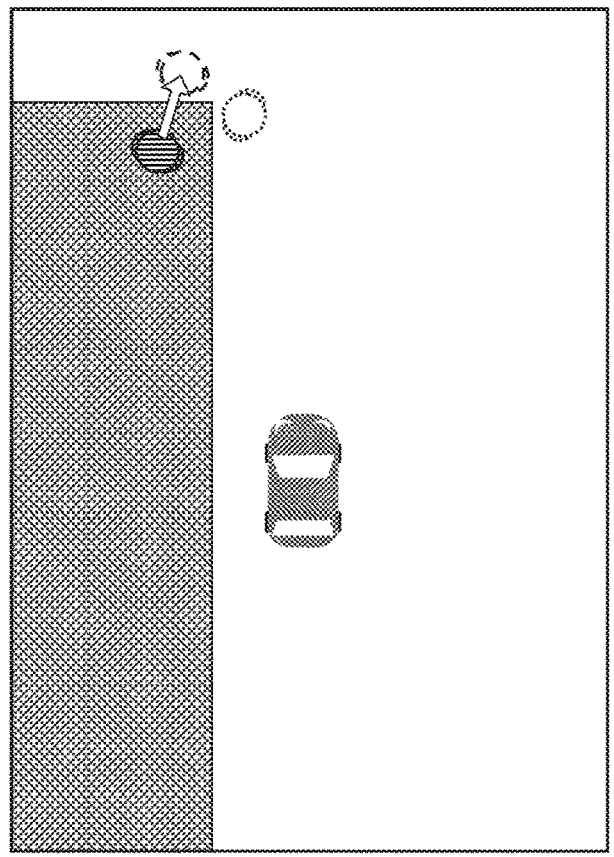
FIG. 4B is a schematic diagram for explaining an image generated by the remote server described above when the process by the predictor is identified as the cause of the emergency stop of the moving vehicle described above.

Of the human-shaped images shown in the images of FIG. 4A and FIG. 4B, only the image located on the leftmost side is originally shown, which is, for example, the image of the target represented by the observation data obtained by observer 11 at time $T_a$. The other two human-shaped images are superimposed based on the information obtained from log recorder 210 by image generator 231. In each image, the human-shaped image having the outline of the dotted line located at a place off the sidewalk to the right is an image indicating the position of the target after a predetermined time, which was output by predictor 112 at time $T_b$. The image having the outline of the broken line located at the tip of the arrow starting from the image originally shown indicates the position of the target at the time after a predetermined time predicted by predictor 112 from the image located at the starting point of the arrow (after time $T_a$ and before time $T_b$). That is, the arrow indicates the direction and magnitude of the movement of the target predicted by predictor 112 from the image located at the starting point.

The operator who sees the images of FIG. 4A and FIG. 4B can take into account, for example, the surrounding conditions of moving vehicle 100 and the target grasped from the images, or the time difference from safety control limit time $T_0$ and the predicted position of the target, and determine whether there is a problem in the prediction process by predictor 112. If it is determined that there is a problem in the prediction process by predictor 112, the operator may determine that the travelling of moving vehicle 100 cannot be restarted by autonomous driving.

Figure 5A:
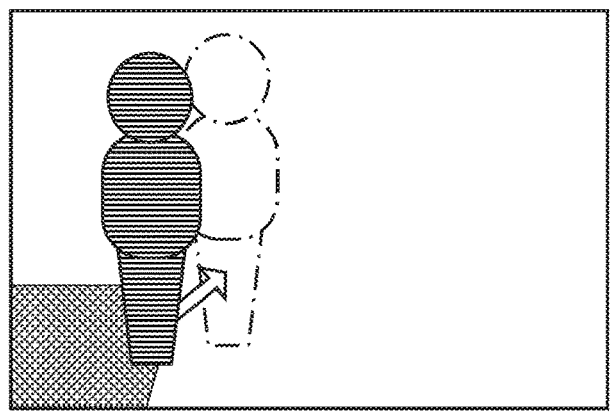
FIG. 5A is a schematic diagram for explaining an image generated by the remote server described above when the process by the predictor is identified as the cause of the emergency stop of the moving vehicle described above.
Figure 5B:
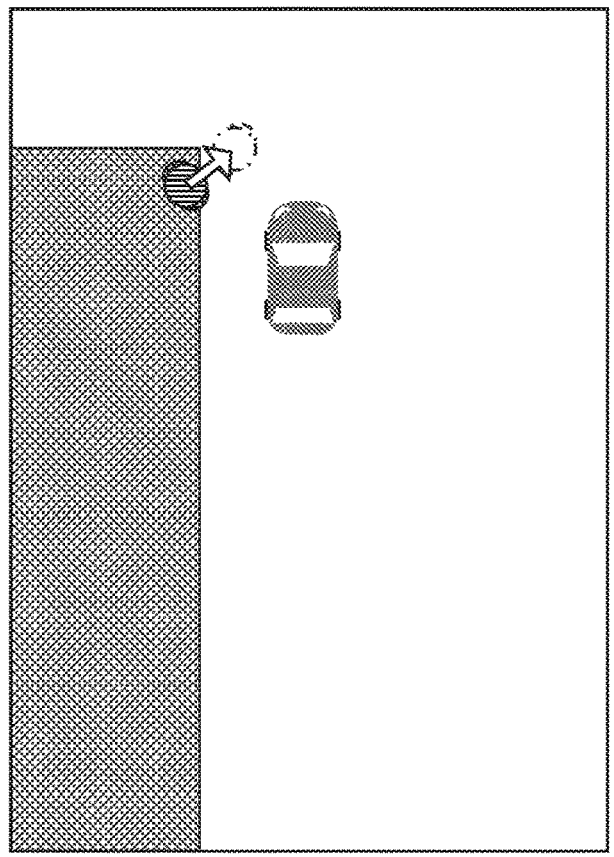
FIG. 5B is a schematic diagram for explaining an image generated by the remote server described above when the process by the predictor is identified as the cause of the emergency stop of the moving vehicle described above.

FIG. 5A and FIG. 5B are schematic diagrams for explaining the images generated by image generator 231 using the logs of the data generated by observer 11 and the data generated by autonomous driving system 110 for the time period from time $T_b$ when predictor 112 output the prediction result related to the emergency stop to time T when moving vehicle 100 stopped due to the emergency stop.

The human-shaped image shown by the solid line in FIG. 5A and FIG. 5B is an image of the target represented by the observation data obtained by observer 11 at time $T_b$. The arrow indicates the direction and magnitude of the movement of the target predicted by predictor 112 from this image located at the starting point thereof. The human-shaped image having the outline of the alternate long and short dash line located off the sidewalk to the right is the position of the target related to this prediction, and is also the image based on which determiner 113 determined to execute the emergency stop. For example, in the continuation of the images of FIG. 4A and FIG. 4B, when the image of the target, the arrow and the human shape of the broken line move over time, and the human shape of the broken line matches the human shape of the dotted line indicating the outline of the image on which the determination to execute the emergency stop was based, the broken line changes to an alternate long and short dash line.

For example, an operator who sees the images of FIG. 5A and FIG. 5B as a continuation of the images of FIG. 4A and FIG. 4B can easily grasp the time difference between the time corresponding to the image in which the broken line was changed to the alternate long and short dash line and safety control limit time $T_0$.

Figure 6A:
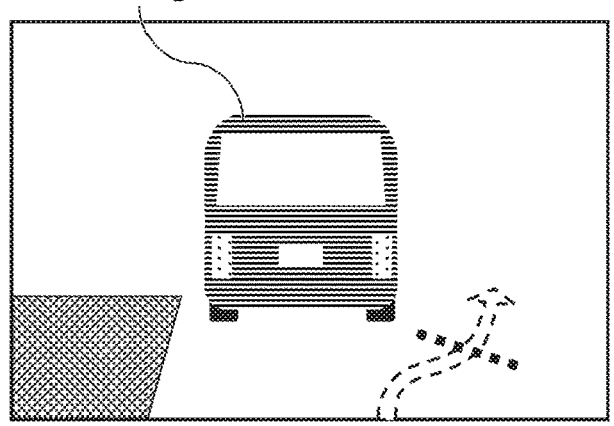
FIG. 6A is a schematic diagram for explaining an image generated by the remote server described above when a process by the determiner is identified as the cause of the emergency stop of the moving vehicle described above.
Figure 6B:
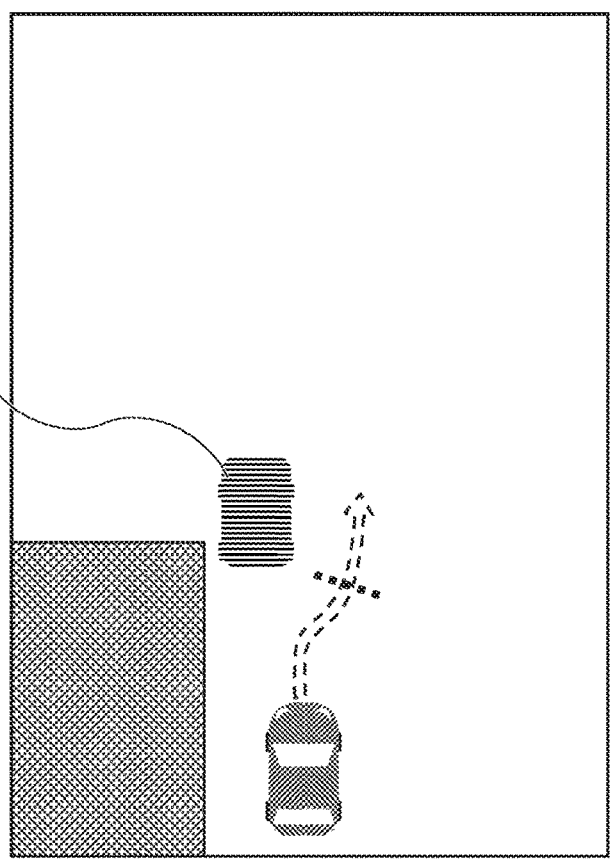
FIG. 6B is a schematic diagram for explaining an image generated by the remote server described above when the process by the determiner is identified as the cause of the emergency stop of the moving vehicle described above.

3. In a Case where the Determiner is Identified as the Cause Having LED to the Emergency Stop FIG. 6A and FIG. 6B are schematic diagrams for explaining the images generated by image generator 231 using the logs of the data generated by observer 11 and the data generated by autonomous driving system 110 for a time period from time $T_b$ when predictor 112 output the prediction result related to the emergency stop to time $T_c$ when determiner 113 output the instruction for control based on the determination result related to the emergency stop. Each image of FIG. 6A and FIG. 6B includes an image at time $T_b$ of a moving vehicle ("Other moving vehicle" in the figure) which is a target located in front of moving vehicle 100 based on the data obtained by observer 11 at time $T_b$. In addition, the broken line arrow and the dotted line segment seen in the lower right of the image of the other moving vehicle in FIG. 6A and FIG. 6B are superimposed based on the information obtained from log recorder 210 by image generator 231. The broken line arrow indicates the route of moving vehicle 100 planned by determiner 113 by time $T_b$. In addition, the dotted line segment indicates the planned stop position related to the emergency stop instruction output by determiner 113 at time $T_c$.

The operator who sees the images of FIG. 6A and FIG. 6B can confirm the situation around, for example, this planned stop position, moving vehicle 100, and the target grasped from the images.

Figure 7A:
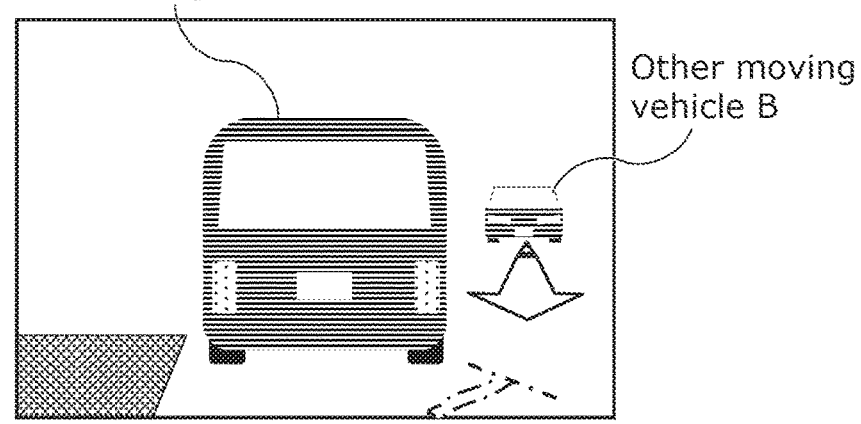
FIG. 7A is a schematic diagram for explaining an image generated by the remote server described above when the process by the determiner is identified as the cause of the emergency stop of the moving vehicle described above.
Figure 7B:
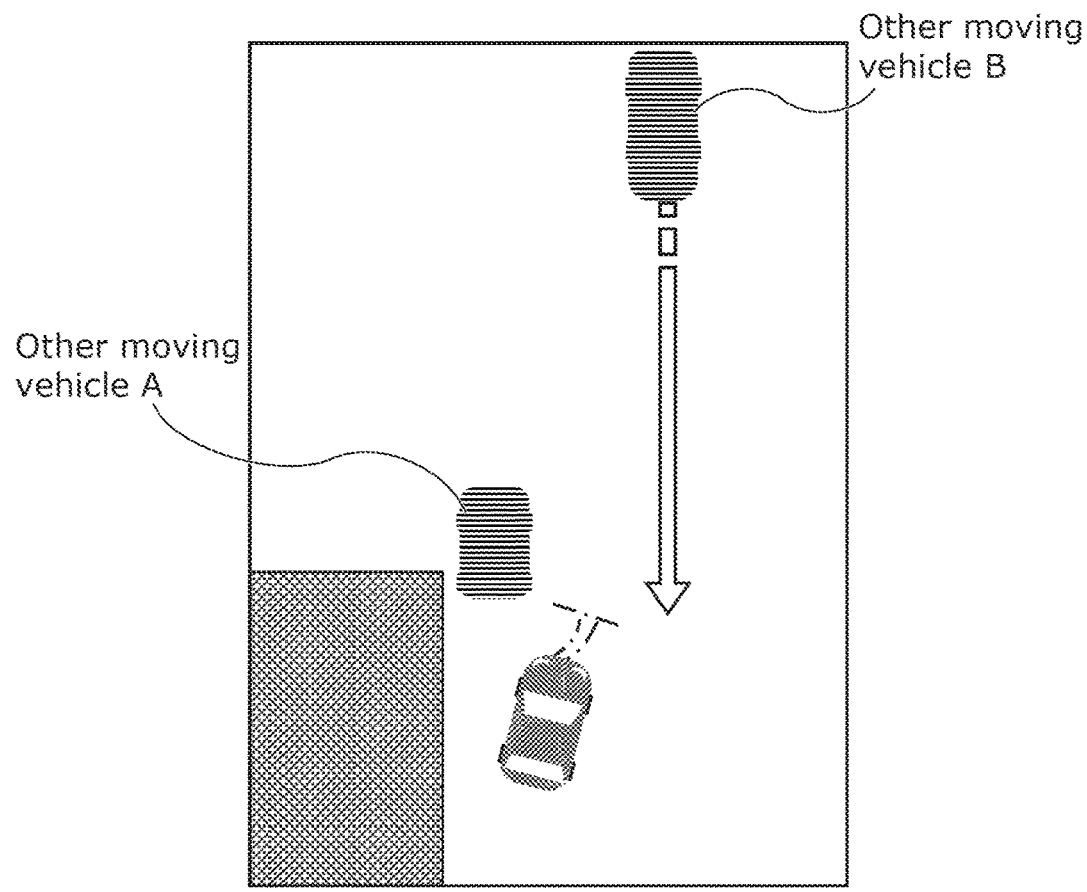
FIG. 7B is a schematic diagram for explaining an image generated by the remote server described above when the process by the determiner is identified as the cause of the emergency stop of the moving vehicle described above.

FIG. 7A and FIG. 7B are schematic diagrams for explaining the images generated by image generator 231 using the logs of the data generated by observer 11 and the data generated by autonomous driving system 110 for a time period from time $T_c$ when determiner 113 output an instruction for control based on the determination result related to the emergency stop to time T when moving vehicle 100 stopped due to the emergency stop. Each image of FIG. 7A and FIG. 7B includes images at time $T_c$ of two moving vehicles ("Other moving vehicle A" and "Other moving vehicle B" in the figure) which are targets located in front of moving vehicle 100 based on the data obtained by observer 11 at time $T_c$. In addition, the band and line segment of the alternate long and short dash line seen in the lower right of the image of other moving vehicle A as well as the arrow seen under other moving vehicle B in FIG. 7A and FIG. 7B are superimposed based on the information obtained from log recorder 210 by image generator 231. The belt and line segment of the alternate long and short dash line show the planned route and stop position of moving vehicle 100 determined by determiner 113 in the determination related to the emergency stop, as well as the route in which moving vehicle 100 traveled by time T and the stop position at time T. That is, the plan by determiner 113 and the control result of moving vehicle 100 by moving vehicle controller 12 match each other. In addition, the arrow indicates the prediction route of other moving vehicle B output by predictor 112, which is related to the instruction for control output by determiner 113 by time $T_c$.

The operator who saw the images of FIG. 7A and FIG. 7B can confirm, for example, the alignment of the route and stop position planned for the emergency stop with the travelling route and stop position of moving vehicle 100 as a control result, as well as the situation around the target at the time of outputting the instruction of control for the emergency stop.

The images illustrated with reference to examples in FIG. 2A to FIG. 7B are used as components of the UI described below together with the candidates for situations in which an emergency stop may occur, which are registered in situation database 232 mentioned above.

(UI Configuration)

The configuration of the UI provided by UI controller 233 to the operator via output device 21 and input device 22 will be described below with reference to an example.

The UI includes a component that presents to the operator the process in autonomous driving system 110 identified by cause identifier 223 as the cause having led to the emergency stop of moving vehicle 100.

The UI further includes a component that is obtained from situation database 232 and presents to the operator candidates for situations in which an emergency stop may occur according to the above process identified as the cause having led to the emergency stop.

The UI further includes a component that presents an image that is for allowing the operator to confirm the actual situation in which an emergency stop has occurred in order to select an appropriate one from the above candidates, and is generated by image generator 231.

The UI further includes a configuration that presents to the operator whether the autonomous travelling of moving vehicle 100 determined by travel restartability determiner 234 can be restarted.

Figure 8:
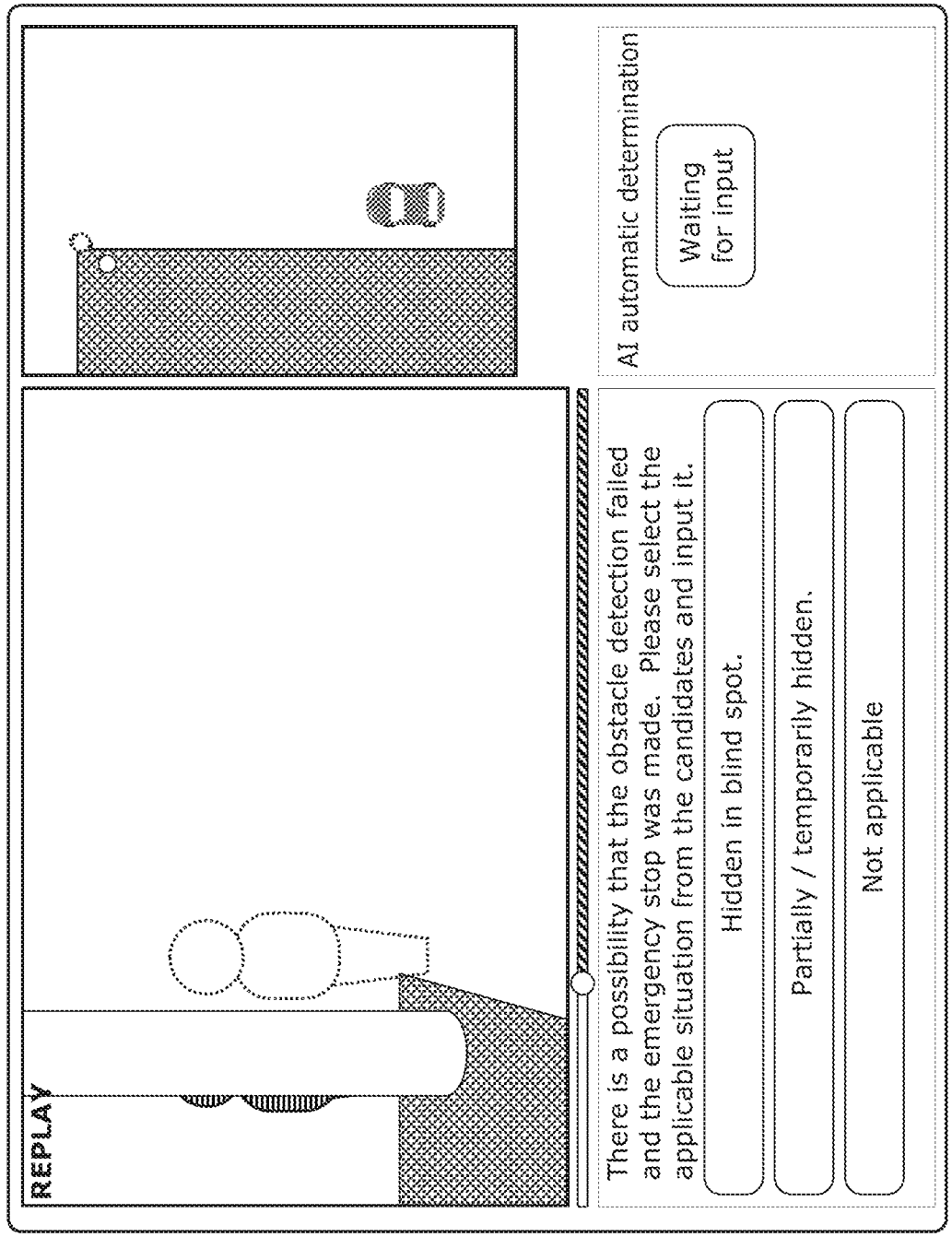
FIG. 8 is an example of a user interface (hereinafter referred to as UI) controlled by a UI controller in the remote server described above and presented to an operator.
Figure 9:
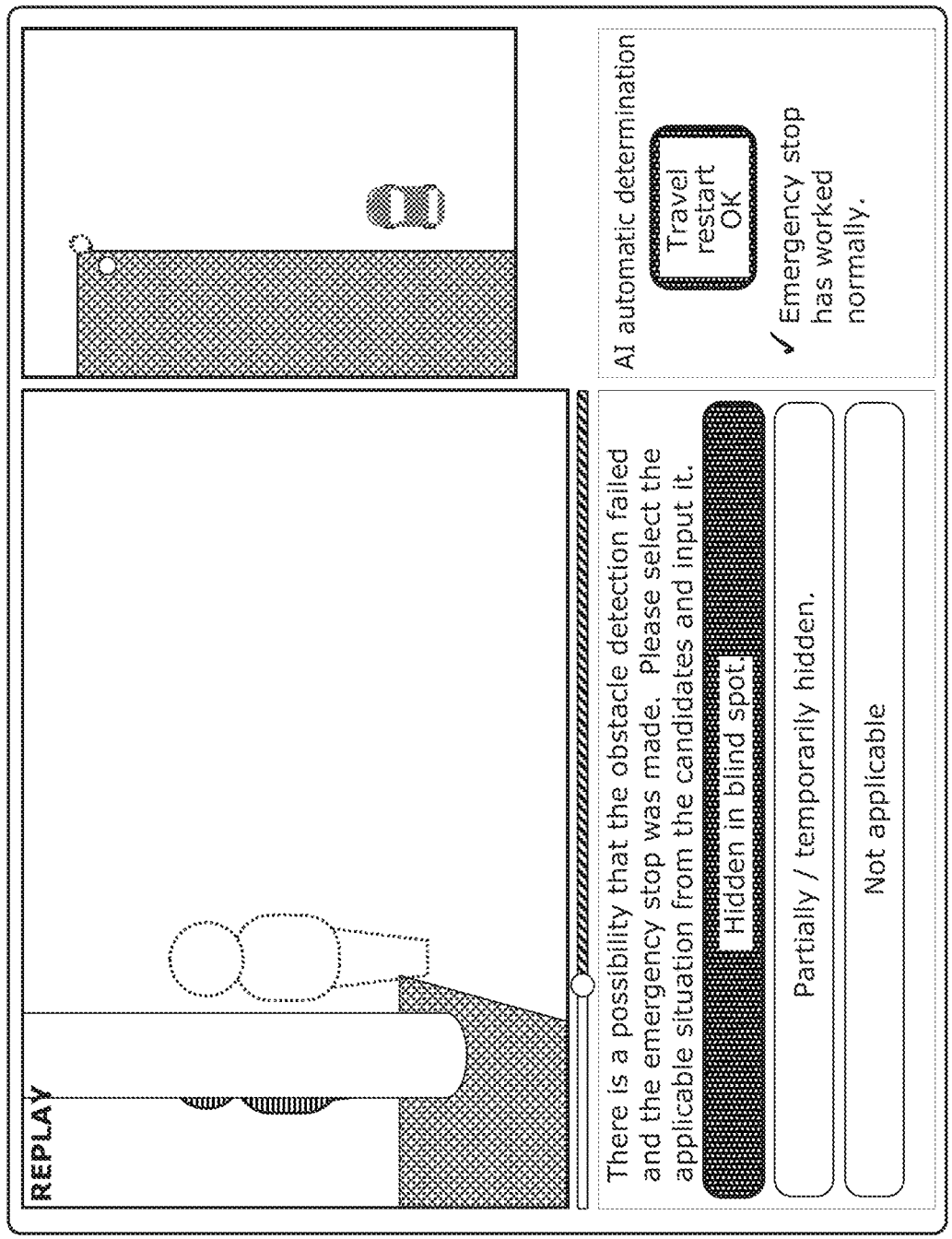
FIG. 9 is an example of a UI presented in response to input by the operator.
Figure 10:
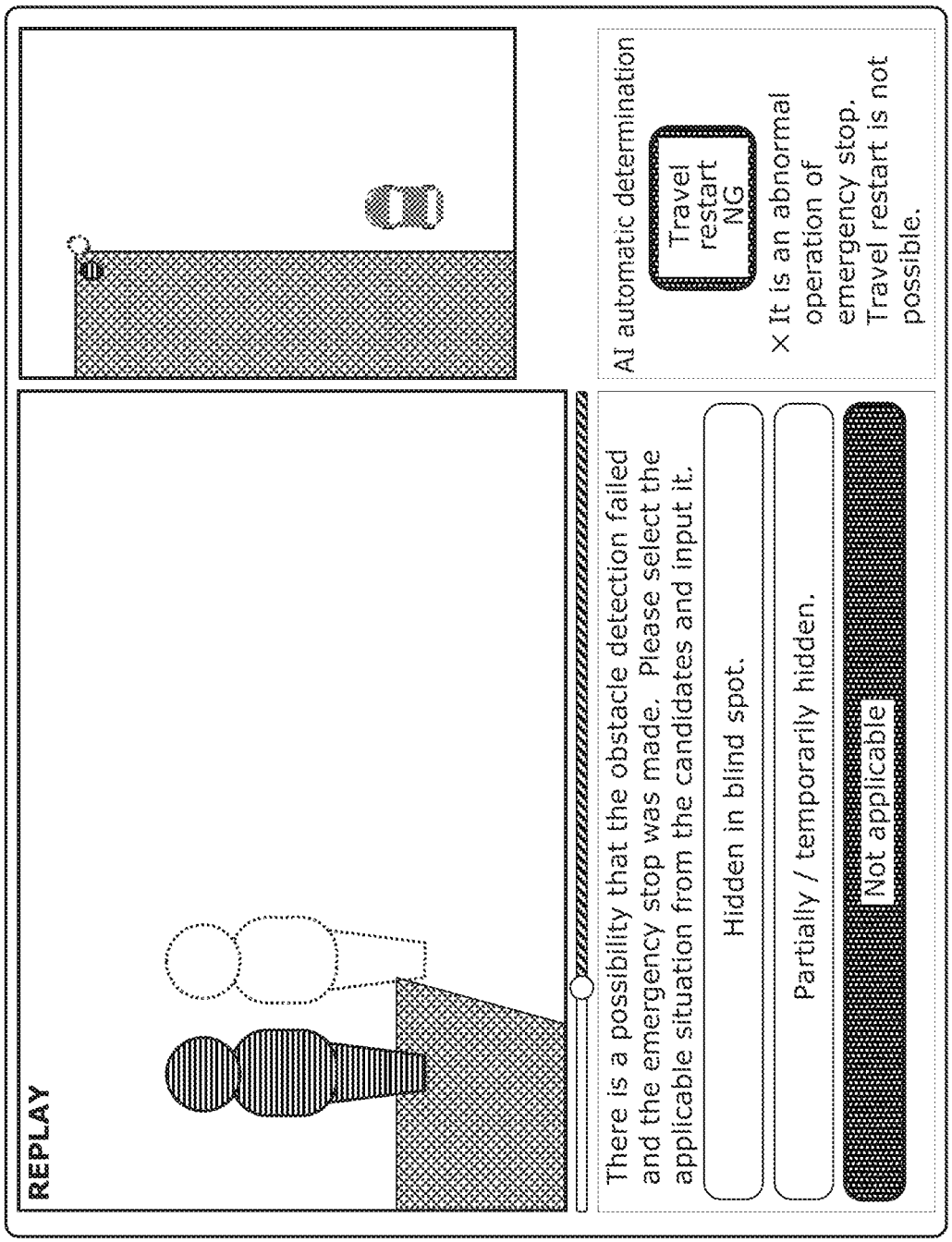
FIG. 10 is an example of a UI presented in response to input by the operator.

For example, the UI presented to the operator when the process by detector 111 is identified as the cause having led to the emergency stop of moving vehicle 100 is as shown in FIG. 8 to FIG. 10.

These UIs are a series of screens including examples of each component described above. The operator can operate the seek bar in the middle of the screen to see an image of the surroundings of moving vehicle 100 before and after the time when moving vehicle 100 reached the emergency stop. This image is an image generated by image generator 231.

FIG. 8 is a screen that presents this image and a candidate for a situation in which an emergency stop may occur as an option. On this screen, the operator has not yet entered the selected situation.

On each of the UI screens shown in FIG. 9 and FIG. 10, the result of whether the vehicle can be restarted, which has been determined by travel restartability determiner 234 according to the result of the input by the operator is presented to the operator (See "AI automatic determination" column at the bottom right of the screen).

Hereinafter, the components in each figure will be described in more detail.

The sentence "There is a possibility that the obstacle detection failed and the emergency stop was made." seen under the seek bar in FIG. 8 to FIG. 10 is a component that presents to the operator that the process in autonomous driving system 110 identified by cause identifier 223 as the cause having led to the emergency stop of moving vehicle 100 is "detection".

In addition, "Hidden in blind spot of moving vehicle" and "Partially/temporarily hidden" lined up below this sentence are examples of candidates for situations where an emergency stop may occur, which has been obtained from situation database 232 by UI controller 233 in response to the process of "detection" identified as the cause having led to an emergency stop. It should be noted that "not applicable" which is further below these is a candidate selected when the operator thinks that the above two candidates obtained from situation database 232 do not correspond to the actual situation.

In addition, the two images arranged side by side above the sentence indicating the identified cause are examples of the images presented to the operator for confirmation of the occurrence situation of the emergency stop, which have been generated from the log held by image generator 231 in log recorder 210. In the examples of FIG. 8 and FIG. 9, the images illustrated in FIGS. 2A and 2B are included in the images presented for confirmation of the occurrence of this emergency stop.

In the AI automatic determination column, the result of the determination of whether the travel can be restarted by travel restartability determiner 234 is input. This determination is based on the operator's input result for the situation where an emergency stop has occurred.

FIG. 9 is an example of the UI presented when the operator who saw the image generated by image generator 231 and grasped the situation where the person who was an obstacle was hidden in the columnar workpiece input a selection of "hidden in blind spot" from the displayed situation candidates. In this example, in the AI automatic determination column, the phrase "Travel restart OK" indicating the result of the determination of whether the travel can be restarted by travel restartability determiner 234 is displayed. Furthermore, in this example, the phrase "Emergency stop has worked normally" is also displayed to indicate that autonomous driving system 110 is normal.

FIG. 10 is an example of the UI presented when the operator who saw the image generated by image generator 231 and grasped the situation where the person who was an obstacle was not sufficiently hidden from the front selected and input "Not applicable" from the displayed situation candidates. In this example, in the AI automatic determination column, the phrase "Travel restart NG" indicating the result of the determination of whether the travel can be restarted by travel restartability determiner 234 is displayed. Furthermore, in this example, the phrases "It is an abnormal operation of emergency stop. Travel restart is not possible." are also displayed to indicate that autonomous driving system 110 can be abnormal.

These displays such as "Travel restart OK" or "Travel restart NG" are buttons that accept operator's input. When the operator who has confirmed this determination result presses these buttons, a travel restartability signal indicating whether the travel can be restarted is transmitted from transmitter 240 to moving vehicle 100 according to the result of this determination. It should be noted that in these examples illustrated in the figures, the operator only confirms the determination result, but the present invention is not limited thereto. For example, the UI may include a component that allows the operator to select to approve or disapprove the determination result (and redo the situation selection).

(Method of Determining Whether to Restart Travelling)

Travel restartability determiner 234 determines whether the travel of moving vehicle 100 can be restarted by autonomous travel in response to the input of the situation selected by the operator from the candidates for situations where the emergency stop may occur. An example of this method of determining whether the travel can be restarted by travel restartability determiner 234 for each process of autonomous driving system 110 identified as having an abnormality will be described below.

It should be noted that in this description, in preparation for the determination, a parameter indicating the safety level or the risk level of the execution of the autonomous travel control is used for the situation selected and input by the operator as the corresponding situation. For example, a parameter is used in which a value of 1 is used when the travel restart is safe, and a value of 0 is used when it is unsafe or dangerous. Alternatively, each candidate for the situation presented to the operator may be given the value of the parameter in advance in the situation database.

1. In a Case where the Detection Process is Identified as the Cause Having LED to the Emergency Stop Assume that the situation input as the operator's choice is that the obstacle related to the emergency stop is "Hidden in blind spot." or "Partially/temporarily hidden." (See FIG. 9). In these situations, it is difficult to detect because obstacles are unlikely to appear in the observation data from observer 11 such as a camera or LiDAR. Therefore, assuming that the occurrence of an emergency stop has been in an unavoidable situation in the autonomous travelling by autonomous driving system 110, that is, it is safe to restart travelling rather than an abnormality of autonomous driving system 110, 1 is given as a parameter value.

In addition, assume that neither of the above two situations is applicable, that is, "Not applicable" is input (see FIG. 10). In this case, if autonomous driving system 110 is normal, the obstacle should have been detected sufficiently in front and no emergency stop should have occurred. That is, there is a possibility that autonomous driving system 110 has an abnormality, and it is unsafe to restart travelling. Therefore, 0 is given as the value of the parameter. However, in reality, there are situations in which it is difficult to detect, even if it is not "Hidden in blind spot" or "Partially/temporarily hidden". For example, when an obstacle is detected from a camera image, it is difficult to detect if the obstacle is assimilated with the background, and when the obstacle is a pedestrian, it is difficult to detect it when it is crouching. For such a problem, for example, a candidate "assimilated with the background" is newly registered in database 232. If the detection process can detect up to the class of the object, measures such as registering different candidates according to the class can be considered.

In terms of language, how to distinguish between "Hidden in the blind spot." and "Partially/temporarily hidden." depends on the operator. With respect to such ambiguity, the positional relationship between the obstacle and other obstacles detected other than the obstacle, or the positional relationship between the obstacle and the blind spot area that can be obtained from the map information can be expressed numerically. For that reason, the server determines whether the overlapping area between the obstacle and the other obstacle or the blind spot area exceeds the threshold value, and if the threshold value is exceeded, information indicating the overlap between the obstacle and the other obstacle or the blind spot area or information indicating the degree of the overlap may be superimposed on the image at that time, and the superimposed image may be presented to the operator. In this way, ambiguity can be efficiently eliminated by having the operator confirm the image on which information useful for the determination is superimposed.

In addition, in the selection of candidates, the candidates may be narrowed down in advance and the narrowed down candidates may be presented. In addition, the result of provisional selection by the server may be presented and approved by the operator. For example, based on the overlapping state of past obstacles with other obstacles or blind spot areas and the situation selected by the operator at that time, the candidates may be narrowed down to two or more situations, and the narrowed down candidates may be presented to the operator. In addition, instead of narrowing down, one situation candidate may be tentatively selected, and the tentatively selected situation candidate may be presented to the operator.

2. In a Case where the Prediction Process is Identified as the Cause Having LED to the Emergency Stop Assume that the operator selected and input one or more situations among the situations in which the obstacle related to the emergency stop "has started moving", "had been moving, but it stopped", and "changed the direction of travel while moving". In this case, the obstacle is difficult to predict because it has started or stopped moving in a hurry, or the direction information that is difficult to predict has changed. Therefore, assuming that the occurrence of an emergency stop has been in an unavoidable situation in the autonomous driving by autonomous driving system 110, that is, it is safe to restart travelling rather than an abnormality of autonomous driving system 110, 1 is given as a parameter value.

In addition, assume that "Not applicable" is selected and input. In this case, since the obstacle is not moving or is moving in one direction, if autonomous driving system 110 is normal, the movement route of the obstacle should have been predicted sufficiently in front and no emergency stop should have occurred. That is, there is a possibility that autonomous driving system 110 has an abnormality, and it is unsafe to restart travelling. Therefore, 0 is given as the value of the parameter.

In the real world, there is almost no movement that does not change direction at all, and how to distinguish between the start and stop of movement and the sudden acceleration and deceleration depends on the operator. Such ambiguity can be expressed numerically by associating the detection results of the positions of the obstacle in chronological order. For that reason, the server may detect acceleration and deceleration of movement exceeding the threshold value or change in direction, superimpose the detection result on the image at that time, and present the superimposed image to the operator. In this way, ambiguity can be efficiently eliminated by having the operator confirm the image on which information useful for the determination is superimposed.

In addition, in the selection of candidates, the candidates may be narrowed down in advance and the narrowed down candidates may be presented. In addition, a separate process may be performed on the server side to make a selection in advance, and then the operator may confirm the selection result. For example, based on the acceleration and deceleration or change of direction of the movement of obstacles in the past and the situation selected by the operator at that time, the candidates may be narrowed down to two or more situations, and the narrowed down candidates may be presented to the operator. In addition, instead of narrowing down, one situation candidate may be tentatively selected, and the tentatively selected situation candidate may be presented to the operator.

The above is because it is considered that the server can estimate the situation based on the contents confirmed by the operator so far, when the processing result on the server side of the above candidate selection can be sufficiently trusted, for example, in the case of the occurrence of an emergency stop due to the obstacle popping out at a spot where the existence of the blind spot area has been confirmed through the service operation so far or the like.

3. In a Case where the Determination Process is Identified as the Cause Having LED to the Emergency Stop Assume that the operator selects and inputs the situation that "Another obstacle suddenly enters the planned travel route of the own moving vehicle". In this case, it is difficult to determine that the speed is controlled by deceleration so as not to approach this obstacle excessively. Therefore, assuming that the occurrence of an emergency stop has been in an unavoidable situation in the autonomous driving by autonomous driving system 110, that is, it is safe to restart travelling rather than an abnormality of autonomous driving system 110, 1 is given as a parameter value.

In addition, if the unavoidable situation as described above does not apply, the deceleration control should have been executed by making a determination to decelerate so as not to get too close to the obstacle sufficiently in front of the obstacle, and no emergency stop should have occurred. That is, there is a possibility that autonomous driving system 110 has an abnormality, and it is unsafe to restart travelling. Therefore, 0 is given as the value of the parameter.

It depends on the operator whether it is unexpected or not that another obstacle has entered the planned travel route of the own moving vehicle. Such ambiguity can be expressed numerically by associating the detection results of the positions of the other obstacle in chronological order.

For that reason, the server may detect acceleration and deceleration of movement exceeding the threshold value or change in direction, superimpose the detection result on the image at that time, and present the superimposed image to the operator. In this way, ambiguity can be efficiently eliminated by having the operator confirm the image on which information useful for the determination is superimposed.

In addition, a separate process may be performed on the server side to make a selection in advance, and then the operator may confirm the selection result. For example, based on the acceleration and deceleration or change of direction of the movement of obstacles in the past and the situation selected by the operator at that time, the situation candidate may be tentatively selected, and the tentatively selected situation candidate may be presented to the operator.

In addition, in determining whether it is unexpected or not, the restartability may change depending on what kind of object the obstacle that has entered the planned travel route is (for example, whether it is a car, a human, or an animal). For that reason, situation candidates are registered for each obstacle class, and based on the acceleration and deceleration or change of direction of the movement of each obstacle class in the past and the situation selected by the operator at that time, the candidates may be narrowed down to two or more situations, and the narrowed down candidates may be presented to the operator. In addition, instead of narrowing down, one situation candidate may be tentatively selected, and the tentatively selected situation candidate may be presented to the operator.

It should be noted that for the "other obstacle", when cause identifier 223 has also identified the process by detector 111 or predictor 112 as the cause, the value of the parameter may be given by the operator inputting the selection from the candidates of the above situations in each case again.

Travel restartability determiner 234 outputs to UI controller 233 the determination result that the travel can be restarted if the value given to the parameter for the operator's input is 1, or the determination result that the travel cannot be restarted if the value given to the parameter for the operator's input is 0. UI controller 233 controls the display in the "AI automatic determination" column according to this determination result input from travel restartability determiner 234.

It should be noted that further developmentally, whether to restart travelling may be determined more strictly.

For example, if the cause is the detection process and the obstacle related to the emergency stop is hidden in the blind spot, the emergency stop may be unavoidable. However, it is conceivable that the probability of occurrence of control that leads to an accident such as an emergency stop will change significantly according to how quickly detector 111 can detect this obstacle after the situation where the obstacle related to the emergency stop is hidden in the blind spot changes to the situation where the obstacle related to the emergency stop is observable.

In this case, image generator 231 obtains from the identification result of cause identifier 223 how much time difference from safety control limit time $T_0$ the identified process has produced the expected output, and generates an image as described above.

Then, the operator follows the images generated by image generator 231 in chronological order via input device 22, and inputs which situation candidate the image at each time corresponds to.

Upon receiving this input, travel restartability determiner 234 having received this input can determine whether the travel can be restarted according to whether the time period from the change of the situation until the obstacle is detected exceeds an allowable value of the process delay. It should be noted that the time period from when the situation changes (or from when the obstacle is detected after the situation changes) until the position of the obstacle is predicted, or the time period from when the situation changes (or from when the obstacle is detected after the situation changes) until an emergency stop is determined may be compared to an allowable value.

[Operation]

Figure 11:
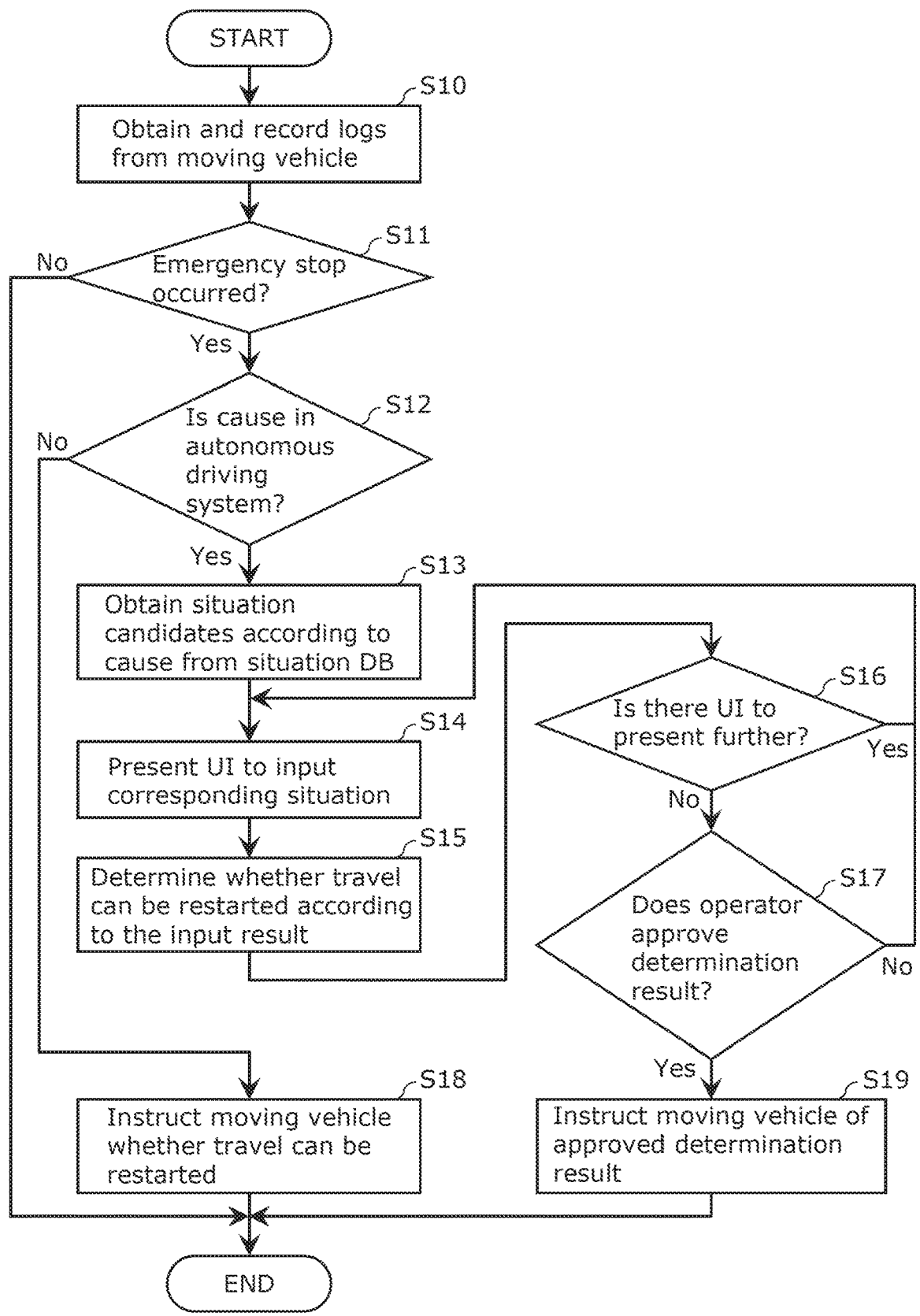
FIG. 11 is a flowchart for explaining a series of flows of the information processing method according to the embodiment.

Next, the procedure of the information processing method according to the present embodiment, which is executed by remote server 200 that communicates with moving vehicle 100, will be described. FIG. 11 is a flowchart showing a procedure example of the information processing method according to the present embodiment.

When remote server 200 obtains any of sensor log 211, travel log 212, and process log 213 transmitted from autonomous driving system 110 of moving vehicle 100, these logs are recorded in log recorder 210 (step S10).

Operation detector 221 of first information processing unit 220 refers to process log 213 or travel log 212 in order to detect the occurrence of an emergency stop in moving vehicle 100 (step S11). If no emergency stop has occurred (No in step S11), the process for the log obtained in step S10 ends.

When the occurrence of an emergency stop is detected (Yes in step S11), time calculator 222 and cause identifier 223 of first information processing unit 220 determine whether the cause having led to this emergency stop has been identified to be any process by detector 111, predictor 112, or determiner 113 of autonomous driving system 110, or it is a system error (step S12). If the cause having led to the emergency stop is determined to be a system error (No in step S12), a travel restartability signal indicating that autonomous travel cannot be restarted is transmitted from cause identifier 223 through transmitter 240 to moving vehicle 100 (step S18).

If the cause having led to the emergency stop is the process in autonomous driving system 110 (Yes in step S12), UI controller 233 of second information processing unit 230 obtains the candidates of the situations where the emergency stop may occur from situation database 232 according to the process identified to be the cause having led to the emergency stop (Step S13).

UI controller 233 presents the UI, which includes an image showing an actual situation generated by using the information extracted from log recorder 210 by image generator 231 in which moving vehicle 100 has reached an emergency stop, and the candidates for the situations obtained in step S13, to the operator via output device 21 (step S14). The UI presented here is, for example, a screen as shown in FIG. 8 on which the operator selects and inputs an appropriate candidate as an explanation of the situation having led to the emergency stop.

Travel restartability determiner 234 determines whether the travel of moving vehicle 100 can be restarted by autonomous travel according to the input result of the situation corresponding to the actual situation selected by the operator from the situation candidates via input device 22 (Step S15). It should be noted that the determination here may be a tentative determination, or the determination may be made after further input related to the situation is obtained from the operator. If there is a UI for asking the operator for further input related to the situation (Yes in step S16), the procedures from step S14 are repeated by UI controller 233.

When all the UIs to be presented to the operator are presented and input is obtained (No in step S16), UI controller 233 presents to the operator via output device 21 the UI in which the information of the determination result of the travel restartability by travel restartability determiner 234 has been reflected to UI controller 233, and requests approval (or confirmation) (step S17). For example, a screen as shown in FIG. 9 or FIG. 10 is presented.

When it is detected by UI controller 233 that the operator approves the determination result of whether to restart travelling via input device 22 (Yes in step S17), the travel restartability signal according to this approved determination result is transmitted from transmitter 240 to moving vehicle 100 (step S19). It should be noted that if the operator refuses to approve the determination result of whether to restart travelling (No in step S17), the process returns to step S14 in this procedure example. In this case, in step S14 and subsequent steps, the UI once presented may be presented again, for example, in order to make the operator reconfirm and reselect the corresponding situation.

(Variations and Supplements)

The information processing method according to one or more aspects of the present disclosure is not limited to the description of the above embodiment. Forms obtained by applying various modifications to the above embodiment conceived by a person skilled in the art without departing from the spirit of the present disclosure are also included in the aspects of the present disclosure. Examples of such modifications and other supplements to the description of the embodiment are given below.

(1) In the above embodiment, the safety control has been described as a control in which a vehicle is stopped by the normal autonomous travel control at the position where the vehicle was stopped by the emergency stop, but the aspects of the safety control are not limited thereto. The safety control may be a control in which the vehicle continues to travel while avoiding obstacles related to the emergency stop in actual driving with, for example, the steering and the acceleration and deceleration as necessary.

(2) In the above embodiment, the value of the parameter indicating the safety level or the risk level is determined according to the situation selected and input from the candidates as the corresponding situation by the operator, but it is not limited thereto. For example, the value of the above parameter may be a value related to the time when the candidate of the situation input with respect to the time period until the safety control limit time corresponds. More specifically, the closer the accidental route intrusion of another moving vehicle occurs in a time zone to the safety control limit time, less likely that the emergency stop is abnormal for the operation of the autonomous driving system and the lower the safety level. Another example of a parameter value may be a value for the output of the process identified as the cause of the emergency stop, which indicates a safety level or risk level based on the length of the delay time from the safety control limit time.

In addition, the frequent occurrence of emergency stops in a specific candidate is considered to mean that the vehicle is travelling dangerously, so each time there is a certain number of inputs to the candidate, the value indicating the safety level or risk level may be updated. The values of the parameters listed here are not limited to binary values such as 0 and 1, but more multi-step values can be used.

Furthermore, it is conceivable to set the parameter with a continuous value from 0 to 1. It is conceivable that when an emergency stop occurs, the greater the speed of the moving vehicle, the closer it is to the obstacle, and the more emergency stops occur with the same candidate, the greater the danger. Based on these data, it is also conceivable to create correct answer data for the safety level or the risk level, and to learn by using the above parameters as weights. Of course, the operator may manually give the correct answer data.

(3) A part or all of the functional components included in each of the above-mentioned information processing systems may be configured by one system large scale integration (LSI). The system LSI is a super-multifunctional LSI manufactured by integrating a plurality of components on one chip, and specifically, is a computer system including a microprocessor, ROM, RAM, and the like. A computer program is stored in the ROM. When the microprocessor operates according to this computer program, the system LSI achieves the function of each component.

It should be noted that although it is referred to as a system LSI here, it may be referred to as an IC, an LSI, a super LSI, or an ultra LSI due to the difference in the degree of integration. In addition, the method of making an integrated circuit is not limited to the LSI, and may be realized by a dedicated circuit or a general-purpose processor. A field programmable gate array (FPGA) that can be programmed after the LSI is manufactured, or a reconfigurable processor that can reconfigure the connections and settings of circuit cells inside the LSI may be used.

Furthermore, if an integrated circuit technology that replaces an LSI appears due to advances in semiconductor technology or another technology derived therefrom, functional blocks may be integrated using that technology. The application of biotechnology or the like may be possible.

(4) One aspect of the present disclosure is not limited to the information processing method described above using the flow chart in FIG. 11, and may be a program executed by a computer and an information processing system including the computer. In addition, one aspect of the present disclosure may be a computer-readable, non-temporary recording medium on which such a computer program is recorded.

INDUSTRIAL APPLICABILITY

The technology according to the present disclosure can be used as an information processing method executed when an emergency stop of an autonomously travelling moving vehicle occurs, an information processing device executing such an information processing method, or a program for causing an information processing device to execute such an information processing method.

The invention claimed is:

1. An information processing method executed by a processor, the information processing method comprising:
   determining whether an emergency stop for causing a moving vehicle that is autonomously travelling to avoid a collision with an obstacle has occurred;
   when it is determined that the emergency stop has occurred, simulating safety control based on a travel situation history of the moving vehicle, the safety control being an autonomous travel control for causing the moving vehicle to autonomously travel to avoid the collision with the obstacle without performing the emergency stop;
   obtaining a log of an autonomous driving system that executes the autonomous travel control of the moving vehicle, calculating a safety control time by comparing the safety control with the autonomous travel control indicated by the log, and identifying a process that is a cause of the emergency stop from processes for the autonomous travel control indicated by the log, based on the autonomous travel control indicated by the log and the safety control time, the safety control time being a start time of execution of the safety control in the autonomous travel control of the moving vehicle;
   obtaining, from a database related to situations that possibly lead to an occurrence of the emergency stop, one or more situation candidates corresponding to the process identified, and presenting an interface to an operator for inputting a situation candidate from the one or more situation candidates that corresponds to a situation indicated by the log; and
   determining restartability of the autonomous travel control by the autonomous driving system according to the situation candidate input.

2. The information processing method according to claim 1,
   wherein the identifying of the process that is the cause of the emergency stop is performed based on a result of determining whether a result of a process required for executing the safety control was output before the safety control time.

3. The information processing method according to claim 2,
   wherein the process required for executing the safety control is at least one of a detection process for obtaining a detection result indicating a surrounding situation of the moving vehicle, a prediction process for predicting the surrounding situation of the moving vehicle using the detection result, or a determination process for determining a travelling route according to the surrounding situation predicted.

4. The information processing method according to claim 2,
   wherein the interface includes an image generated using an output of the process identified and observation data input to the autonomous driving system.

5. The information processing method according to claim 4,
   wherein the interface includes an image generated further using an output obtained at the safety control time in the safety control.

6. The information processing method according to claim 5,
   wherein the interface is for inputting the situation candidate corresponding to the situation indicated by the log for a time point after the safety control time.

7. The information processing method according to claim 2,
   wherein the restartability of the autonomous travel control is determined based on a value of a parameter indicating a safety level or a risk level of execution of the autonomous travel control, the value being set for the situation candidate input.

8. The information processing method according to claim 7,
wherein the parameter is based on a length of delay time from the safety control time of the output of the process identified.

9. The information processing method according to claim 7,
wherein the parameter is related to a time period corresponding to the situation candidate input, and
the situation candidate is input with respect to a time period until the safety control time.

10. The information processing method according to claim 1,
wherein the safety control is control to stop the moving vehicle at a stop position in case of the emergency stop or at a position short of the stop position.

11. The information processing method according to claim 1,
wherein the safety control is control to cause the moving vehicle to travel without colliding with the obstacle.

12. An information processing system comprising:
one or more computers including a processor,
wherein the processor
determines whether an emergency stop for causing a moving vehicle that is autonomously travelling to avoid a collision with an obstacle has occurred;
when it is determined that the emergency stop has occurred, simulates safety control based on a travel situation history of the moving vehicle, the safety control being an autonomous travel control for causing the moving vehicle to autonomously travel to avoid the collision with the obstacle without performing the emergency stop;
obtains a log of an autonomous driving system that executes the autonomous travel control of the moving vehicle, calculates a safety control time by comparing the safety control with the autonomous travel control indicated by the log, and identifies a process that is a cause of the emergency stop from processes for the autonomous travel control indicated by the log, based on the autonomous travel control indicated by the log and the safety control time, the safety control time being a start time of execution of the safety control in the autonomous travel control of the moving vehicle;
obtains, from a database related to situations that possibly lead to an occurrence of the emergency stop, one or more situation candidates corresponding to the process identified, and presents an interface to an operator for inputting a situation candidate from the one or more situation candidates that corresponds to a situation indicated by the log; and
determines restartability of the autonomous travel control by the autonomous driving system according to the situation candidate input.

* * * * *